(12) United States Patent
Millington

(10) Patent No.: US 6,172,641 B1
(45) Date of Patent: Jan. 9, 2001

(54) NAVIGATION SYSTEM WITH AUDIBLE ROUTE GUIDANCE INSTRUCTIONS

(75) Inventor: Jeffrey Alan Millington, Rochester Hills, MI (US)

(73) Assignee: Magellan DIS, Inc., Rochester Hills, MI (US)

( * ) Notice: Under 35 U.S.C. 154(b), the term of this patent shall be extended for 0 days.

(21) Appl. No.: 09/058,060

(22) Filed: Apr. 9, 1998

(51) Int. Cl.[7] ............................. H04B 7/185; G01S 5/02
(52) U.S. Cl. ................. 342/357.13; 701/211; 340/996
(58) Field of Search ................. 342/357.13; 701/211; 340/996

(56) References Cited

U.S. PATENT DOCUMENTS

| | | | |
|---|---|---|---|
| 4,393,270 | 7/1983 | van den Berg | 179/1 D |
| 4,679,147 | 7/1987 | Tsujii et al. | 364/449 |
| 4,937,751 | 6/1990 | Nimura et al. | 364/449 |
| 5,177,685 | 1/1993 | Davis et al. | 364/443 |
| 5,406,492 | 4/1995 | Suzuki | 364/449 |
| 5,495,416 | 2/1996 | Buchwitz et al. | 364/449 |
| 5,592,389 | 1/1997 | La Rue et al. | 364/449 |
| 5,935,193 | * 8/1999 | Saiki | 701/211 |

* cited by examiner

Primary Examiner—Theodore M. Blum
(74) Attorney, Agent, or Firm—Carlson, Gaskey & olds

(57) ABSTRACT

The invention relates to a method and a device for combining an in-vehicle navigation system with a sound system in a vehicle. The combination permits the navigation system to project audible maneuver instructions to a driver. While projecting the audible maneuver instruction to the driver the vehicle navigation system moves the location of the projection of the maneuver instruction from a first location to a second location. The first location does not coincide with the content of the maneuver instruction and the second location does coincide with the content of the maneuver instruction. Thus, a system is provided wherein the driver perceives the audible maneuver instruction as moving in a direction which coincides with the content of the instruction.

16 Claims, 2 Drawing Sheets

NAVIGATION SYSTEM WITH AUDIBLE ROUTE GUIDANCE INSTRUCTIONS

BACKGROUND OF THE INVENTION

This invention generally relates to navigation or route guidance systems and, more particularly, to a navigation system that provides audible route guidance instructions to a user of the navigation system.

Navigation systems generally provide a recommended route from a starting point to a desired destination. Generally, the starting point and desired destination are selected from a large database of roads stored in a mass media storage, such as a CD ROM, which includes the roads in the area to be travelled by the user. The navigation system can be located in a personal computer or it can be installed in a vehicle. If the navigation system is installed in a vehicle, the starting point is typically the current position of the vehicle, which can be input to the navigation system by an associated position determining system that usually includes a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point and desired destination and highlighting the recommended route. Preferably, if the navigation system is installed in a vehicle, the navigation system displays the current position of the vehicle and provides visual turn-by-turn instructions to the driver, guiding the driver to the selected destination.

Many navigation systems also provide audible turn-by-turn instructions to the driver. One such system is that disclosed in U.S. Pat. No. 5,406,492 wherein an instruction is perceived by the driver to be emanating from a fixed direction that is determined by the content of the instruction. One disadvantage of such a system is that drivers do not always correctly perceive the direction of the fixed source and thus any benefit derived by associating the source of the instruction with its content is lost.

Thus, it is desirable to provide a system for projecting audible instructions that enhances the ability of a driver to correctly perceive the content of the instruction. It is also desirable to provide a system that is readily adaptable to a typical vehicle audio system.

SUMMARY OF THE INVENTION

In general terms, this invention provides a vehicle navigation system in combination with a vehicle audio system that provides audible maneuver instructions to a driver, which the driver perceives as moving in a direction that corresponds to the content of the instruction.

The navigation system generally includes a database of a plurality of roads, a position determining system, an input device, and a route determination system. The position determining system determines a position of the vehicle relative to the plurality of roads. The user selects a destination from the database with the input device. The route determination system determines a route from the position of the vehicle to the selected destination via a plurality of maneuvers on the plurality of roads. The navigation system generates an audible maneuver instruction based on one of the plurality of maneuvers. The sound system, which is connected to the vehicle navigation system, is used by the navigation system to project the audible maneuver instruction. The audible maneuver instruction is generated from a first location and a second location and is moved from the first location to the second location during the output of the audible maneuver instruction.

The method of the invention comprises the steps of determining a route on a plurality of roads between a starting position and a destination. Selecting a first audible maneuver instruction from a database of audible maneuver instructions based on the determined route. The first audible maneuver instruction is initially projected from a first location and moved to a second location, which is based on the content of the first audible maneuver instruction, while projecting the first audible maneuver instruction.

This invention enhances the ability of a driver to perceive the content of an audible maneuver instruction using the audio system typically found in a vehicle.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
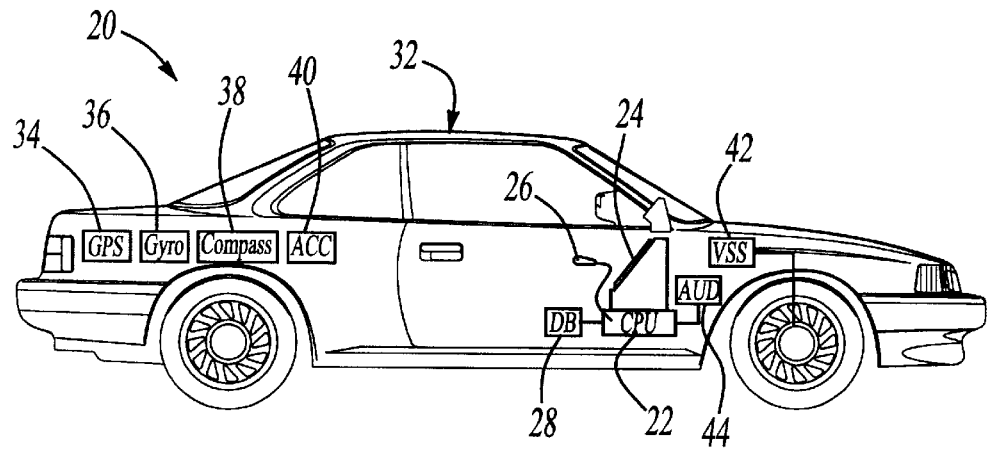
FIG. 1 is a schematic of a navigation system connected to a sound system installed in a vehicle.

The navigation system 20 of the present invention is shown schematically in FIG. 1. The navigation system 20 includes a CPU 22 (Central Processing Unit) connected to a display device 24, such as a high resolution LCD or flat panel display. The CPU 22 is also connected to an input device 26. The navigation system 20 further includes a database 28 connected to the CPU 22. The database 28 is a mass media storage device, such as a CD ROM or hard drive, which includes a map of all the roads in the area to be travelled by the user. Each road in the database is divided into road segments, each having an associated set of cost values, which indicate the "cost" of traveling that road segment. For example, the cost values may include the length of the road segment, the estimated time to travel the road segment, and the type of road (i.e., highway, secondary road, toll road, one way, etc.).

The navigation system 20 can, but need not, be installed in a vehicle 32. The navigation system can be used in conjunction with position determining devices, such as a GPS receiver 34, a gyroscope 36, a compass 38, an orthogonal multi-axis accelerometer 40, and a vehicle speed sensor 42, all connected to the CPU 22 (connections not shown for simplicity). Such position determining devices are well-known and are commercially available. Preferably, a combination of these position determining devices is utilized. A sound system 44 is also connected to the CPU 22.

Figure 2:
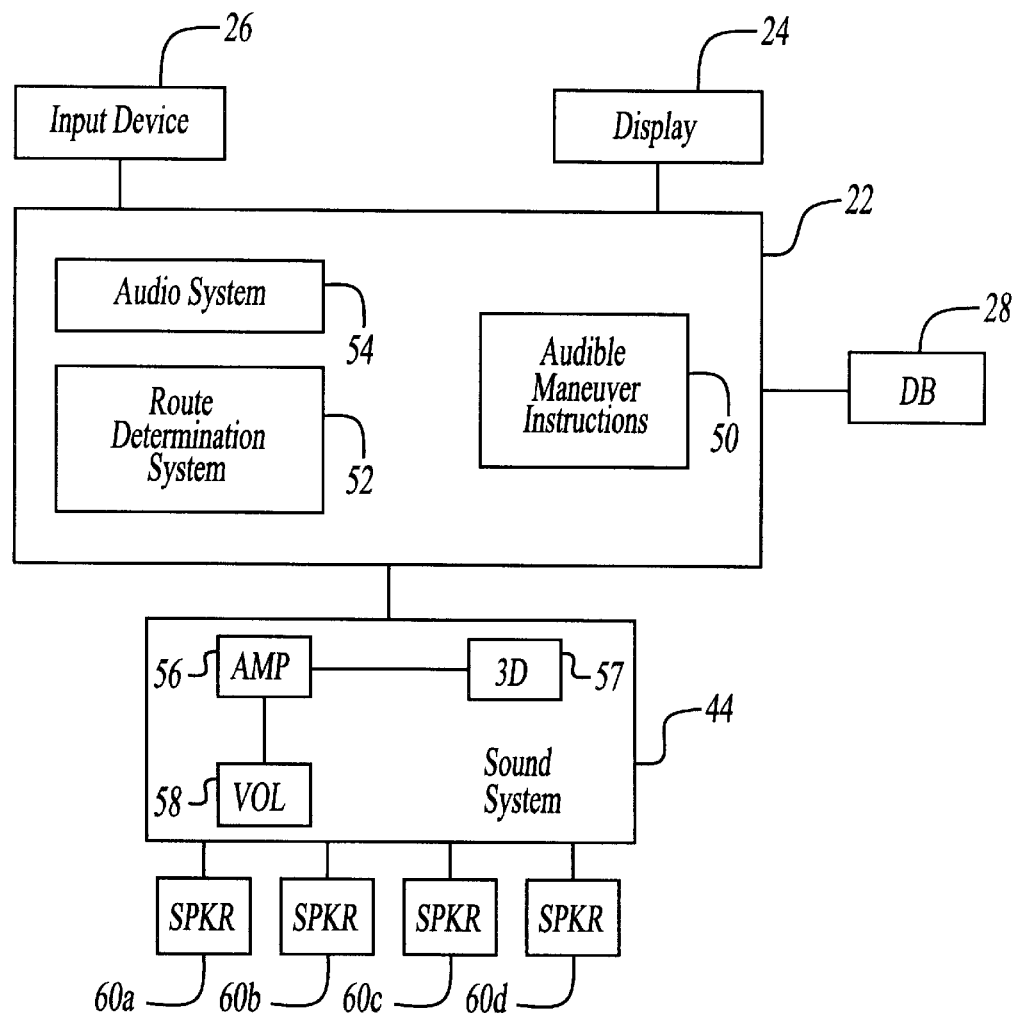
FIG. 2 is a schematic of a processor connected to a sound system and a plurality of loud speakers.

FIG. 2 is a schematic of the CPU 22 connected to the sound system 44. The CPU 22 further includes a database of audible maneuver instructions 50, a route determination system 52, and a future position calculator 54 all preferably implemented in software in the CPU 22. The sound system 44 includes a sound amplifier 56, a three dimensional ("3-D") sound generator 57 and a volume regulator 58. A plurality of loud speakers 60a–60d are connected to the sound system 44. Preferably, the audible maneuver instructions are voice commands, but they could also be tones or other sounds. The 3-D sound generator 57 is of a conventional type known in the art. The 3-D sound generator 57 creates the impression that the sound is coming from a specific location, which may not coincide with the location of any of the plurality of loud speakers 60a–60d. The spatial impression created by the 3-D sound generator 57 enables the sound system 44 to project an audible maneuver instruction from any point within a 360° radius of the driver and also from a location either above or below the driver.

Figure 3:
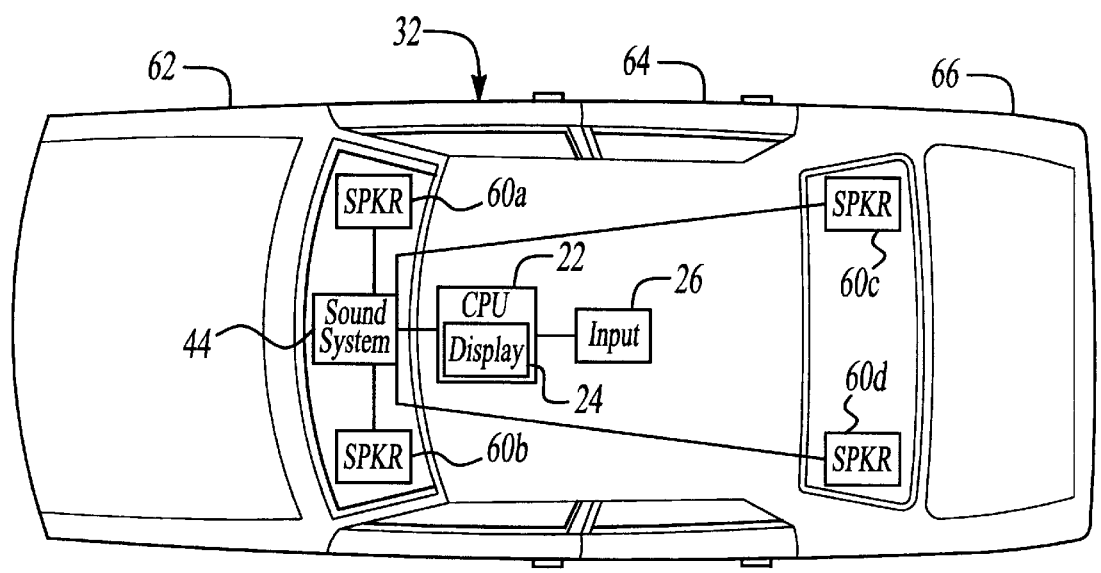
FIG. 3 is a cross-sectional view of the vehicle with the navigation system and sound system of the present invention installed within the vehicle.

In FIG. 3 the CPU 22 and sound system 44 are shown installed in the vehicle 32. The vehicle 32 includes an engine compartment 62, a passenger compartment 64, and a trunk 66. Each of the loudspeakers 60a–60d is placed in one of the four corners of the passenger compartment 64.

By way of illustration, the method of the present invention and the use of the navigation system 20 in combination with the sound system 44 will be described as it would be used to instruct a driver to make a right turn. As will be understood by one of ordinary skill in the art, the method and system would be similarly utilized to provide other route guidance instructions to the driver.

First, a user selects a destination from the database of roads 28 with the input device 26. Then the route determination system 52 in the CPU 22 determines a route from the current position of the vehicle to the selected destination on the database of roads 28. The CPU 22 then displays at least a portion of the route on the display device 24 including the first maneuver, which is generally displayed as a directional arrow having a shape that corresponds to the first maneuver. In addition, the CPU 22 selects a first audible maneuver instruction from the database of audible maneuver instructions 50 based on the first maneuver on the determined route. In our example, this first audible maneuver instruction might be the following: "Turn right at the next intersection."

The content of the first audible maneuver instruction and the direction associated with it coincides with the location of loudspeaker 60a in FIG. 3. The CPU 22 through the sound system 44 would initially begin projecting the instruction through loudspeaker 60d, which is in a location that does not coincide with the direction associated with the instruction. While projecting the instruction the CPU 22 would also begin projecting the instruction through loudspeaker 60a. The CPU 22 would then complete projecting the first maneuver instruction entirely from loudspeaker 60a.

Changing the location that the first audible maneuver instruction is projected from while projecting the first audible maneuver instruction will cause the driver to perceive the first audible maneuver instruction as moving from loudspeaker 60d to 60a during projection of the instruction. This movement of the instruction will create a "whooshing" effect that will enhance the ability of the driver to perceive the content of the first audible instruction maneuver. As will be understood by one of ordinary skill in the art, this could also be accompanied by the CPU 22, through the volume regulator 58, increasing the volume of the instruction as it is projected.

As should be understood, this whooshing effect could also be achieved by volume biasing. In such a method, the CPU 22 would initially project the first audible maneuver instruction from both loudspeaker 60d and loudspeaker 60a with the volume of the instruction projected from loudspeaker 60d being significantly higher than the volume of the instruction as projected from loudspeaker 60a. Then, while projecting the first audible maneuver instruction the CPU 22 would increase the volume at loudspeaker 60a while decreasing the volume at loudspeaker 60d during the projection of the first audible maneuver instruction. This volume biasing would also create a whooshing effect perceived by the driver of moving the instruction from loudspeaker 60d to loudspeaker 60a.

When the sound system 44 includes the 3-D sound generator 57, the whooshing effect that is created may include additional spatial characteristics that are perceived by the driver. For example, projecting the first audible maneuver instruction for a right turn, the 3-D sound generator 57 would create a first audible maneuver instruction that the driver would perceive as whooshing along a pathway in the passenger compartment 64 that coincides with the shape of the directional arrow displayed by the CPU 22 on the display device 24 as noted above. As an additional benefit, when the maneuver actually also involves an upward or downward component such as when exiting onto an off ramp of a highway or entering an on ramp of a highway, respectively, the 3-D sound generator 57 would generate an audible maneuver instruction that is perceived by the driver as whooshing not only in the direction of the right hand turn but also either upwardly or downwardly in a direction that coincides with the actual maneuver being performed.

A second feature of the method of the present invention is to repeat an audible maneuver instruction a plurality of times prior to the position where the maneuver is to be executed. The CPU 22 in conjunction with the GPS receiver 34 accurately determines its current position on the database of roads 28. Utilizing the vehicle speed sensor 42 and a direction of travel indicator such as the compass 38 the future position calculator 54 of the CPU 22 determines a future position of the vehicle 32. At predetermined distances between the current position and a calculated future position the CPU 22 repeats the first audible maneuver instruction. In addition, the volume of the first audible maneuver instruction increases as the distance between the current position and the calculated future position, which coincides with the position of the first maneuver, decreases.

If a user should fail to execute the next required maneuver on the determined route, the CPU 22 projects the first audible maneuver instruction from one of the rear loudspeakers 60c or 60d. In the example described above, if a driver had failed to make the right turn, the CPU 22 would project the first audible maneuver instruction from the right, rear loudspeaker 60c.

A third feature of the method of the present invention is that the sound system 44 can also be used to cue a driver as to the relative location of a icon on the display device 24. Such a cue would be a sound projected from a location that coincides with the location of the icon on the display device 24. For example, an icon located in the upper right quadrant of the display device 24 would be cued to the driver by projecting a sound that the driver would perceive as emanating from a location ahead and to the right of the driver. The sound cue could either be a tone or voice command.

As will be understood by one of ordinary skill in the art other maneuvers such as a left-hand turn would be projected in an appropriate fashion as described above to provide to the driver a perception that the audible instruction maneuver is moving in a direction coinciding with the content of the audible maneuver instruction.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

I claim:

1. An in-vehicle navigation system comprising:
   a database including a plurality of roads;
   a position determining system, said position determining system determining a position of the vehicle relative to said plurality of roads;
   an input device for selecting a destination from said database;
   a route determination system, said system determining a route from said position of the vehicle to said destination via a plurality of maneuvers on said plurality of roads; and
   a sound system for projecting an audible maneuver instruction based upon one of said plurality of maneuvers, said sound system projecting said audible maneuver instruction from a first location and a second location and moving said audible maneuver instruction from said first location to said second location during the output of said audible maneuver instruction.

2. An in-vehicle navigation system as recited in claim 1, wherein said first location does not coincide with a direction associated with said audible maneuver instruction and said second location coinciding with the direction of said audible maneuver instruction.

3. An in-vehicle navigation system as recited in claim 1, wherein said audible maneuver instruction comprises voice commands.

4. An in-vehicle navigation system as recited in claim 1 wherein said audible maneuver instruction is a first audible maneuver instruction, said navigation system further comprising a database containing a plurality of audible maneuver instructions including said first audible maneuver instruction.

5. An in-vehicle navigation system as recited in claim 1 further comprising a sound amplifier and a plurality of loudspeakers, said loudspeakers connected to said sound amplifier and said audible maneuver instruction projected from said plurality of loudspeakers.

6. An in-vehicle navigation system as recited in claim 5 wherein said first location and said second location each coincide with one of said plurality of loudspeakers.

7. An in-vehicle navigation system as recited in claim 1 further comprising a CPU controlling the movement of said audible maneuver instruction from said first location to said second location.

8. An in-vehicle navigation system as recited in claim 7 further comprising a vehicle speed sensor and a direction of travel detector, said vehicle speed sensor and said direction of travel detector connected to said CPU, said CPU estimating a future position of the vehicle based on the current speed and direction of travel.

9. An in-vehicle navigation system as recited in claim 1 wherein said sound system further includes a three dimensional sound generator and said sound system projecting said audible maneuver instruction from a first location and a second location and moving said audible maneuver instruction from said first location to said second location along a pathway that coincides with the content of said audible instruction during the output of said audible maneuver instruction.

10. A method for guiding a user of an in-vehicle navigation system along a route, said method comprising the following steps:
    a.) determining a route on a plurality of roads between a starting position and a destination;
    b.) selecting a first audible maneuver instruction from a database of audible maneuver instructions based on the route determined in said step a.);
    c.) projecting the first audible maneuver instruction from a first location;
    d.) moving the first audible maneuver instruction from the first location to a second location based on the content of the first audible maneuver instruction while projecting the first audible maneuver instruction.

11. A method for guiding a user of an in-vehicle navigation system along a route as recited in claim 10 further comprising projecting the first audible maneuver instruction from a plurality of loudspeakers.

12. A method for guiding a user of an in-vehicle navigation system along a route as recited in claim 11 wherein said first location and said second location each coincide with one of said plurality of loudspeakers and wherein said first location does not coincide with a direction associated with said first audible maneuver instruction and said second location coinciding with the direction of said first audible maneuver instruction.

13. A method for guiding a user of an in-vehicle navigation system along a route as recited in claim 10 wherein step d.) further includes the step of increasing the volume of the first audible maneuver instruction while moving the first audible maneuver instruction from the first location to the second location.

14. A method for guiding a user of an in-vehicle navigation system along a route as recited in claim 10 further comprising the steps of determining the current vehicle speed, determining the current direction of travel, and repeating the first audible maneuver instruction at a plurality of predetermined distances between the current position and a future position determined by the content of the first audible maneuver instruction.

15. A method for guiding a user of an in-vehicle navigation system along a route as recited in claim 14 wherein said first audible maneuver instruction is repeated at least once from a location behind the user when the user passes said future position and fails to execute said first audible maneuver instruction.

16. A method for guiding a user of an in-vehicle navigation system along a route as recited in claim 10 wherein step d.) includes the further step of moving the first audible maneuver instruction from the first location to the second location along a pathway that coincides with the content of the first audible maneuver instruction while projecting the first audible maneuver instruction.

* * * * *